United States Patent
Sato et al.

(10) Patent No.: US 10,065,401 B2
(45) Date of Patent: Sep. 4, 2018

(54) METHOD AND APPARATUS FOR PRODUCING PREFORM

(71) Applicant: Toray Industries, Inc., Tokyo (JP)

(72) Inventors: Masayuki Sato, Nagoya (JP); Masaaki Yamasaki, Nagoya (JP); Kentaro Nagasaki, Otsu (JP)

(73) Assignee: Toray Industries, Inc. (JP)

( * ) Notice: Subject to any disclaimer, the term of this patent is extended or adjusted under 35 U.S.C. 154(b) by 460 days.

(21) Appl. No.: 14/763,732

(22) PCT Filed: Feb. 19, 2014

(86) PCT No.: PCT/JP2014/053838
§ 371 (c)(1),
(2) Date: Jul. 27, 2015

(87) PCT Pub. No.: WO2014/129481
PCT Pub. Date: Aug. 28, 2014

(65) Prior Publication Data
US 2015/0352821 A1    Dec. 10, 2015

(30) Foreign Application Priority Data

Feb. 21, 2013 (JP) .................................. 2013-031917

(51) Int. Cl.
- *B29C 65/14* (2006.01)
- *B32B 37/06* (2006.01)
- *B32B 37/00* (2006.01)
- *B29B 11/16* (2006.01)

(52) U.S. Cl.
CPC .......... *B32B 37/0046* (2013.01); *B29B 11/16* (2013.01); *B29C 65/1435* (2013.01); *B29C 65/1445* (2013.01); *B32B 37/065* (2013.01); *B32B 2307/20* (2013.01)

(58) Field of Classification Search
None
See application file for complete search history.

(56) References Cited

U.S. PATENT DOCUMENTS

| | | |
|---|---|---|
| 2010/0212823 A1 | 8/2010 | Shibata et al. |
| 2015/0048555 A1 | 2/2015 | Nagasaki et al. |

FOREIGN PATENT DOCUMENTS

| | | |
|---|---|---|
| JP | 59-2815 A | 1/1984 |
| JP | 2009-73132 A | 4/2009 |
| JP | 2011-168009 A | 9/2011 |
| WO | 2013/140786 A1 | 9/2013 |

*Primary Examiner* — Barbara J Musser
(74) *Attorney, Agent, or Firm* — DLA Piper LLP (US)

(57) ABSTRACT

A method of producing a reinforcing fiber preform includes: holding at least one substrate laminate by a shaping mold composed of at least two molds that face each other, wherein the at least one substrate laminate is selected from a substrate laminate produced by laminating multiple reinforcing fiber substrates each having a fixing material applied to at least one surface thereof and a substrate laminate produced by laminating multiple reinforcing fiber substrates with the fixing material interposed therebetween; and subsequently applying an electric current to the substrate laminate in a direction of lamination to heat the reinforcing fiber substrates and thereby apply heat to the fixing material to fix substrate layers in the substrate laminate to each other; wherein a means of making electric resistance in a fixing area is relatively lower compared to that in a non-fixing area in the substrate laminate.

16 Claims, 7 Drawing Sheets

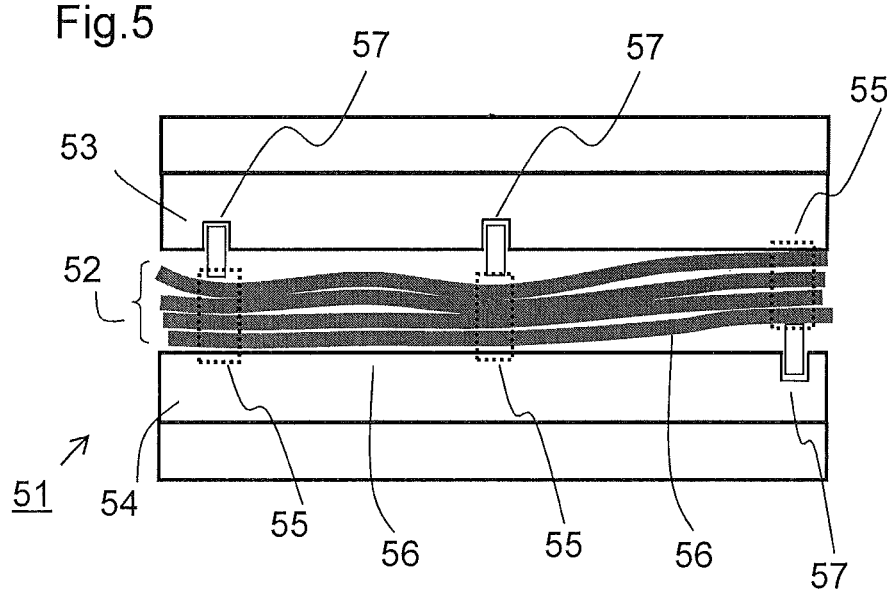
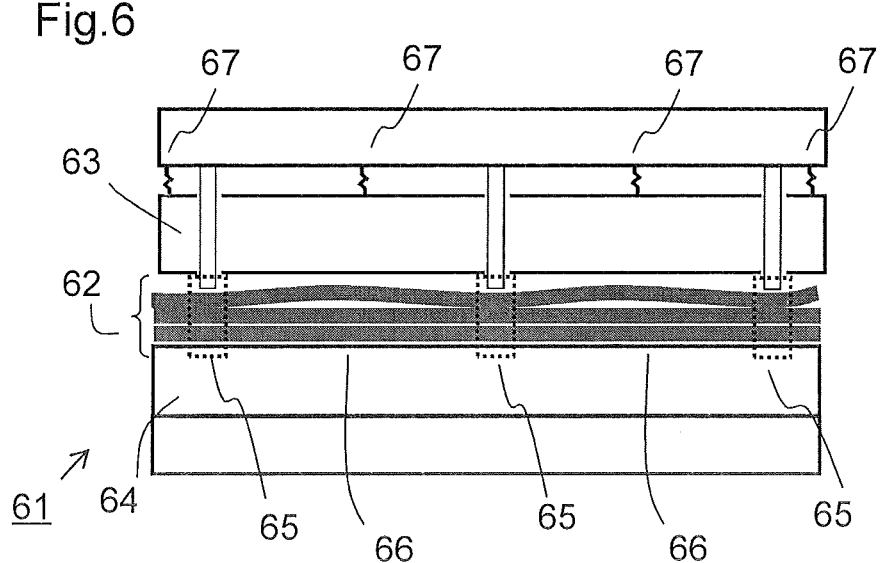

METHOD AND APPARATUS FOR PRODUCING PREFORM

TECHNICAL FIELD

This disclosure relates to a method and an apparatus for producing a preform by laminating multiple reinforcing fiber substrates.

BACKGROUND

As for a fiber-reinforced plastics (FRP) molding method having excellent productivity, a so-called RTM molding method is known, which includes placing a substrate laminate composed of a dry reinforcing fiber fabric in a mold, injecting a matrix resin into the mold to impregnate the reinforcing fiber substrate laminate with the matrix resin, curing the resin, and then demolding the resultant molding. For the production of a relatively large molding or a thick molding, as a highly efficient molding method, such a molding method is often employed that includes, first, draping a reinforcing fiber substrate laminate (e.g., multiple reinforcing fiber substrates) into a predetermined shape to produce a reinforcing fiber substrate laminate preform, which is a molding precursor of an FRP, placing the preform in a mold, injecting a matrix resin into the mold, and then curing the resin with which the substrate is impregnated.

In the production of a preform to be used in the RTM molding, for example, a sequence of steps as mentioned below have conventionally been carried out: (1) a step of placing a substrate laminate produced by laminating multiple substrates on each other in a shaping mold, and then closing the shaping mold to impart a predetermined shape to the substrates by the shaping mold; (2) a step of heating (or preheating) the shaping mold to heat the substrate laminate indirectly, thereby softening or melting a fixing material interposed between the substrates; (3) a step of cooling a preform while keeping the shape of the preform by the shaping mold to solidify the fixing material, thereby fixing the substrate layers to each other; and (4) a step of removing the shaped preform from the shaping mold.

In the sequence of steps, a method of heating using a thermal medium, an electric heater or the like is employed as the method of heating the shaping mold in step (2), and a method of cooling using (ambient temperature or cooled) air, cooling water or the like is employed as the method of cooling in step (3) (see, for example, Japanese Patent Laid-open Publication No. 2011-168009).

In the above-mentioned method in which heating the whole of a shaping mold (generally a metallic mold) using a thermal medium and cooling the whole of the shaping mold are repeated. However, there is a problem in that the time required for one cycle including the heating and cooling is long and the amount of energy consumption required for the heating is large. Therefore, it is difficult to produce a preform having a predetermined shape in a large quantity within a short period of time.

Then, a method is attempted in which an electric current is applied to a substrate laminate or a reinforcing fiber molding in an in-plane direction or a thickness direction and Joule heat generated by electric resistance of reinforcing fibers is utilized to generate heat (see, for example, Japanese Patent Laid-open Publication No. 59-2815 and Japanese Patent Laid-open Publication No. 2009-73132).

That heating method is called a conduction heating method. When the method is used for the production of a preform, only the substrates can be heated without heating the whole of the mold, unlike conventional techniques. That is, heat can be generated in laminated substrates by placing the laminated substrates in a shaping mold composed of an upper mold and a lower mold, closing the shaping mold, pressing the shaping mold, applying an electric current to the substrates in the direction of lamination utilizing the upper and lower molds as electrodes, and utilizing electric resistance of a material constituting each of the substrates to generate the heat. The heat generated in the substrates propagates to a fixing material that is interposed between the substrates and can soften or melt the fixing material. When application of the electric current is completed, the fixing material is cooled by air to atmospheric temperature and solidified and, thereby, the substrate layers are fixed to each other. In this manner, the time required to carry out steps (2) and (3) in the above-mentioned preform production can be greatly shortened. In addition, since the temperature of the substrates can be increased by applying an electric current for a short period of time and the whole of the mold cannot be heated, the amount of energy consumption required for the heating can also be reduced greatly.

However, in the conventional conduction heating methods, a portion to be fixed in a substrate laminate cannot be fixed properly, and a fixed portion cannot be predicted or controlled. Furthermore, there is also a problem that a part of the shaping mold is melted or locally damaged. Therefore, in the conventional conduction heating methods, it is difficult to produce a preform having a predetermined shape with high accuracy and good productivity.

It could therefore be helpful to provide for production of a preform having a predetermined shape, which is a molding precursor of an FRP, employing a conduction heating method, a portion to be fixed in a substrate laminate is fixed properly, the occurrence of the damage of a shaping mold after draping is prevented, the cycle time is shortened to reduce the amount of energy consumption, and productivity of the preform is increased.

SUMMARY

We found that the local melting and damaging of a shaping mold occurs in a part of the shaping mold in which the thickness of the laminate is reduced during pressing. Generally, an electric current flows in a larger amount in an area having lower electric resistance. If there is a thickness-reduced portion in a laminate, the flow of an electric current concentrates only in this portion in which electric resistance is low and heat is generated in the laminate locally and, therefore, an upper mold or a lower mold in the shaping mold is partially melted and damaged at a portion thereof that is located adjacent to the locally heat-generated portion. Furthermore, the above-mentioned concentrated flow of an electric current can also be caused by a small change in the thickness of the cavity of a mold, which is caused in association with the surface roughness of the mold, or a small change in the unevenness of the surface of a fabric that constitutes the reinforcing fiber substrate. If the concentrated and local flow of an electric current occurs in an unintended portion that is different from a portion to be fixed in the substrate laminate, a sufficient amount of an electric current cannot flow at the portion to be fixed and therefore heat cannot be generated in the laminate. As a result, the portion to be fixed cannot be fixed properly.

We thus provide:

A method of producing a reinforcing fiber preform comprising: holding at least one substrate laminate by a shaping mold composed of at least two molds that face each other, wherein the at least one substrate laminate is selected from a substrate laminate which is produced by laminating multiple reinforcing fiber substrates each having a fixing material applied to at least one surface thereof and a substrate laminate which is produced by laminating multiple reinforcing fiber substrates with the fixing material interposed therebetween; and subsequently applying an electric current to the substrate laminate in the direction of lamination to heat the reinforcing fiber substrates and therefore apply heat to the fixing material, thereby fixing the substrate layers in the substrate laminate to each other; wherein a means of making the electric resistance in a fixing area in the substrate laminate relatively lower compared to that in a non-fixing area in the substrate laminate is provided.

We also provide an apparatus for producing a reinforcing fiber preform which is so configured that a power supply is connected to at least two molds, which constitute a shaping mold and face each other, so that a voltage can be applied to a reinforcing fiber substrate laminate placed between the molds of the shaping mold, wherein the apparatus is equipped with a mechanism for making the electric resistance in a fixing area in the substrate laminate relatively lower compared to that in a non-fixing area in the substrate laminate.

It is thus possible to drape a preform, which is a molding precursor of an FRP, into a predetermined shape with a short draping cycle time, with a small amount of energy consumption and with high efficiency, and it also becomes possible to produce a desired preform with high productivity.

According to the method and the apparatus, a portion at which an electric current can flow, which cannot be predicted in the conventional preform production methods employing a conduction heating method, can be utilized as a specified portion. Therefore, it becomes possible to produce a desired preform without damaging a shaping mold or a laminate.

BRIEF DESCRIPTION OF THE DRAWINGS

FIG. 5 shows a schematic sectional view of a shaping mold, which illustrates a third example of the means of making the thickness of a laminate in a fixing area relatively smaller compared to the thickness of the substrate laminate in a non-fixing area.

FIG. 6 shows a schematic sectional view of a shaping mold, which illustrates a fourth example of the means of making the thickness of a laminate in a fixing area relatively smaller compared to the thickness of the substrate laminate in a non-fixing area.

Figure 1A:
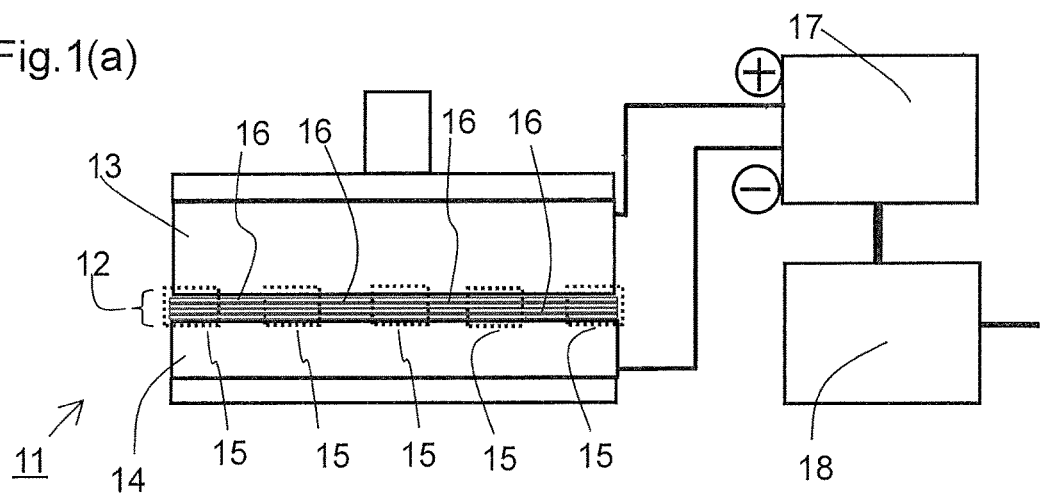
FIGS. 1(a) and 1(b) show schematic constitutional views of a production apparatus which illustrates one example of the method of producing a reinforcing fiber preform.

EXPLANATION OF NUMERALS 11, 21, 31, 41, 51, 61, 71, 81, 91, 101, 111, 121: Shaping mold
12, 22, 32, 42, 52, 62, 72, 82, 92, 102, 112, 122: Substrate laminate
13, 23, 33, 43, 53, 63, 73, 83, 93, 103, 113, 123: Upper mold
14, 24, 34, 44, 54, 64, 74, 84, 94, 104, 114, 124: Lower mold
15, 25, 35, 45, 55, 65, 75, 85, 95: Fixing area
16, 26, 36, 46, 56, 66, 76, 86, 96: Non-fixing area
17, 27: Transformer
18, 28: Power supply
19, 29: Electric current flow pathway
20: Regulation mechanism
37: Protrusion
47: Depression
57, 67: Movable part of mold
77: Conductive material
105, 115, 125: Flat fixing required portion
106, 116: Rising fixing required portion
126: Actually fixed portion
107: Protrusion
117: Aluminum sheet

DETAILED DESCRIPTION

Hereinbelow, preferred examples will be described with reference to drawings. However, our apparatus and methods are not intended to be limited to the examples illustrated in the drawings.

Figure 1B:
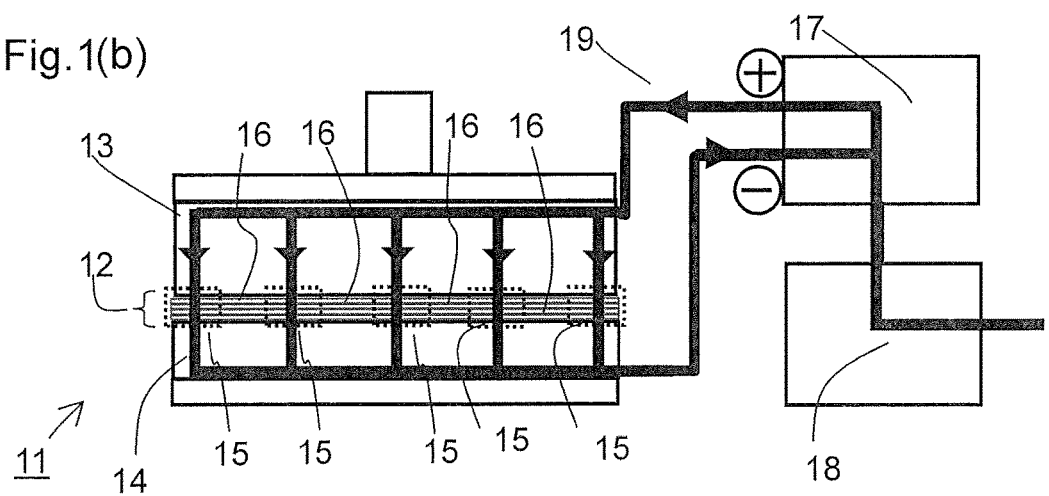

FIG. 1 (a) shows a schematic illustration of the apparatus for producing a reinforcing fiber preform.

A shaping mold 11 is composed of an upper mold 13 and a lower mold 14 which face each other, and the upper mold 13 and the lower mold 14 are connected to a power supply 18 through a transformer 17. Each of the upper mold 13 and the lower mold 14 is made from a conductive material such as aluminum, copper and iron, and can act as an electrode. In each of the upper mold 13 and the lower mold 14, it may be possible that only a part which is in contact with a fixing area in a substrate laminate is made from a conductive material and a part which is in contact with a non-fixing area in the substrate laminate is made from an insulating material. The term "a fixing area" as used herein refers to an area in a substrate laminate in which substrates are needed to be fixed for the purpose of producing a desired preform. The term "a non-fixing area" as used herein refers to an area in a substrate laminate which is other than the fixing area. The voltage of a power supply 18 can be controlled by a transformer 17 and is applied between the upper mold 13 and the lower mold 14.

A voltage is applied to the upper mold 13 and the lower mold 14 while placing a substrate laminate 12 in a predetermined place in a shaping mold 11 and press-draping the substrate laminate 12 in that place, whereby an electric current flows in the substrate laminate 12 in the direction of lamination (i.e., the direction of thickness). It is important to provide a means to set the electric resistance in the fixing area 15 relatively lower compared to that in the non-fixing area 16 in the substrate laminate 12. The electric resistance in the fixing area 15 and the electric resistance in the non-fixing area 16 can be obtained by, for example, carrying out a preliminary test in advance, cutting out a 20-square-mm test piece from each area in a preform obtained after the application of an electric current, attaching a measurement terminal of an insulation resistance meter to each of the front and back surfaces of the cut-out test piece while preventing the thickness of the cut-out test piece from being changed, and then measuring the electric resistance of the cut-out test piece in the direction of lamination. Setting the electric resistance will be mentioned below. According to the specific examples mentioned below, even though the electric resistance in each area before the application of an electric current is not specified particularly, the electric resistance in a fixing area can be made relatively lower compared to that in a non-fixing area.

FIG. 1(*b*) shows a schematic illustration of the apparatus for producing a reinforcing fiber preform in which an electric current is applied.

As mentioned above, in the substrate laminate, an electric current can flow in the fixing area 15 preferentially upon the application of the electric current as illustrated by an electric current flow pathway 19 by making the electric resistance in the fixing area 15 lower compared to that in the non-fixing area 16. In this manner, Joule heat is generated in a reinforcing fiber substrate in the substrate laminate 12 which exists in the fixing area 15, and the heat is transferred to a fixing material (not shown) which is previously interposed between the substrates. As a result, the substrates can be fixed to each other in a manner as mentioned below. That is, it becomes possible to fix an intended area without fail by making the electric resistance in the fixing area 15 lower compared to that in the non-fixing area 16. Although the electric resistance in the fixing area 15 is set to a lower value compared to that in the non-fixing area 16, it is preferred to make the electric resistance uniform in the fixing area 15. When the electric resistance in the fixing area 15 is made uniform, the same amount of an electric current can flow and the same amount of Joule heat can be generated under the same conditions in the fixing area 15 and, therefore, it becomes possible to produce a preform in which the inside of the fixing area 15 is fixed by a uniform fixing force.

Figure 2A:
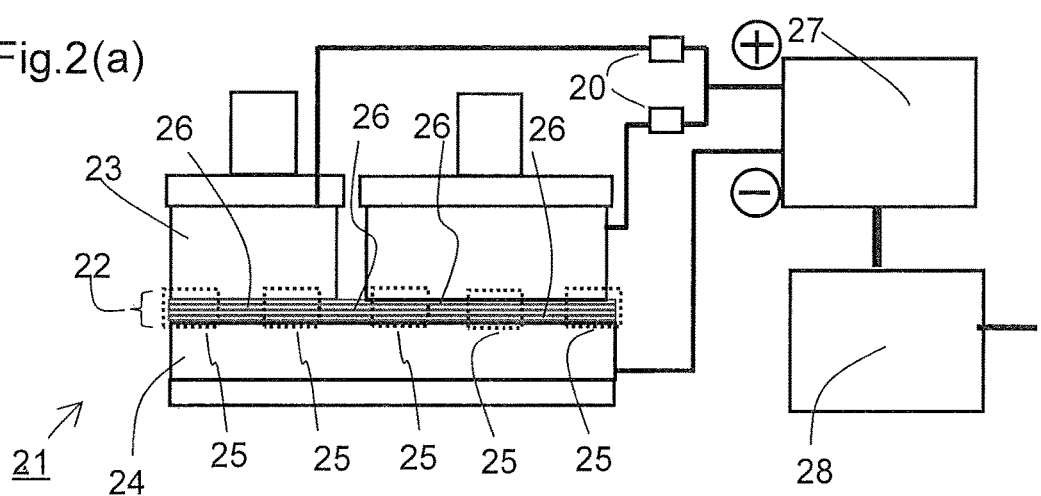
FIGS. 2(a) and 2(b) show schematic constitutional views of a production apparatus which illustrates another example of the method of producing a reinforcing fiber preform.
Figure 2B:
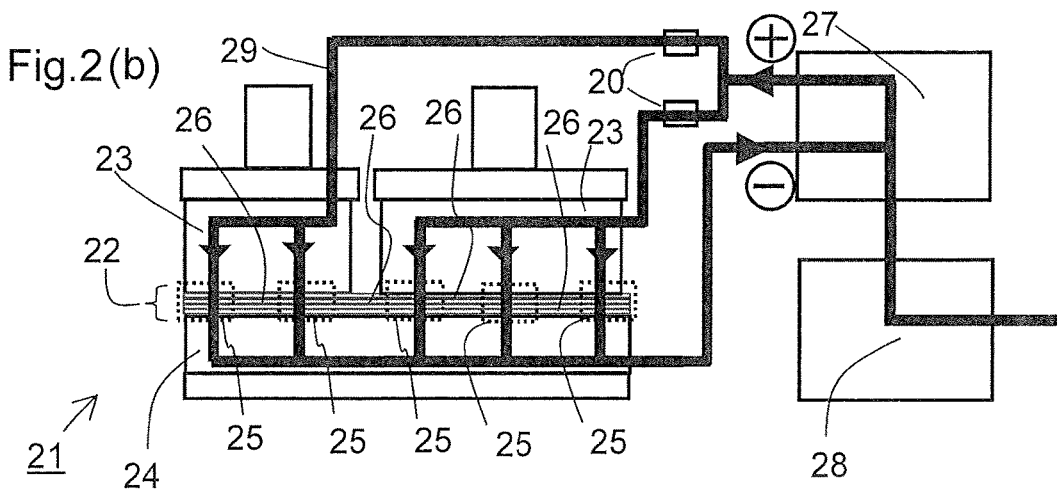

As shown in FIGS. 2(*a*) and 2(*b*), the upper mold and/or the lower mold may be divided into multiple pieces depending on the intended shape or size of a product to be draped. When a voltage is applied to the upper mold 23 and the lower mold 24 while placing the substrate laminate 22 in a predetermined place in the shaping mold 21 and press-draping the substrate laminate 22 in the place, an electric current can flow in the substrate laminate 22 in the direction of lamination (i.e., the direction of thickness) through an electric current flow pathway 29 which is defined by a regulation mechanism 20. When a mold divided into multiple pieces is used, the electric current to be flown in the electric current flow pathway 29 and/or the voltage to be applied to the mold can be controlled by the regulation mechanism 20. For example, different electric currents and/or voltages may be respectively and simultaneously applied to the divided multiple pieces of the mold, or an electric current and/or a voltage may be applied to only a specific piece among the multiple pieces of the mold. Of course, it may also be possible to apply the same amount of an electric current and/or the same amount of a voltage to all of the divided pieces of the mold. Furthermore, when a mold which is divided into multiple pieces is used, an electric current may be applied to only a specific piece of the mold by press-draping only the specific piece among all of the divided pieces of the mold.

The reinforcing fibers to exist in the fixing area are required to have electric conductivity. As the reinforcing fibers having electric conductivity, carbon fibers, metal fibers and the like can be mentioned. To produce a molding having a light weight and excellent mechanical properties by impregnating a preform with a resin and then curing the resin, it is preferred to mainly use carbon fibers. The reinforcing fibers existing in the non-fixing area are not necessarily required to have electric conductivity. However, when reinforcing fibers having electric conductivity are used, reinforcing fibers having the highest volume resistivity among reinforcing fibers existing in the fixing area or reinforcing fibers having a higher volume resistivity than the above-mentioned highest volume resistivity are used. Particularly when the reinforcing fibers are, for example, to be inserted partially in the non-fixing area, the reinforcing fibers are not required to have electrical conductivity, and reinforcing fibers having substantially no electric conductivity such as glass fibers, aramid fibers, boron fibers, alumina fibers, silicon carbide high-strength synthetic fibers, can be used. The form of the reinforcing fiber substrate is not particularly limited, and a one-direction sheet, a woven fabric, a non-woven fabric and the like can be used.

For the purpose of producing the substrate laminate, multiple reinforcing fiber substrates each having a fixing material attached to at least one surface thereof are laminated. The substrate laminate may be produced by laminating multiple reinforcing fiber substrates with a fixing material interposed therebetween. At least one of the substrate laminates produced by the above-mentioned two ways is held by a shaping mold composed of at least two molds that face each other in the above-mentioned manner and, subsequently, an electric current is applied to the substrate laminate in the direction of lamination to heat the reinforcing fiber substrates so that heat can be applied to the fixing material, thereby fixing the substrate layers in the substrate laminate to each other.

The fixing material can have at least one form selected from a powder, a strip, fibers and a sheet. In other words, it is possible to use multiple forms of fixing materials in the laminate depending on the desired shape, mechanical properties and the like of the product. In the substrate laminate, the substrates can be fixed to each other by a thermal fixing method using the fixing material interposed between the substrate layers. The arrangement of the fixing material in the laminate is not particularly limited. The fixing material may be adhered onto each of the substrates in advance or may be inserted between the reinforcing fiber substrates upon the lamination.

The term "a thermal fixing method" as used herein refers to a method including applying heat to the fixing material to physically and/or chemically alter the state of the fixing material, thereby solidifying the fixing material and therefore fixing the substrate layers to each other. For example, when a fixing material containing a thermoplastic resin as the main component is used, the substrates can be fixed to each other by applying heat to the fixing material to melt the fixing material and subsequently cooling the melted fixing material to solidify the fixing material existing between the substrate layers. When a fixing material containing a heat-curable resin as the main component is used, the substrate layers can be fixed to each other by applying heat in an amount required for causing a reaction to the fixing material to solidify (cure) the fixing material existing between the substrate layers. The amount of the fixing material to be applied is preferably 0.1 to 10 parts by weight relative to 100 parts by weight of the reinforcing fiber substrates. If the amount of the fixing material applied is smaller than 0.1 parts by weight, it often happens that the resultant preform cannot keep the shape thereof and therefore the preform cannot be used in molding. On the other hand, if the amount of the fixing material applied is larger than 10 parts by weight, the fixing material might prevent the impregnation with a resin upon molding.

As one means of making the electric resistance in the fixing area 25 relatively lower compared to that in the non-fixing area 26, a means of making the fiber occupation ratio in the fixing area 25 relatively higher compared to that in the non-fixing area 26 upon the holding of the substrate laminate by the shaping mold can be employed. When the fiber occupation ratio in the fixing area 25 is made higher, the fibers existing in the vicinity of the area can be closely adhered and therefore the number of passages through which an electric current can flow can be increased in the area. As a result, the electric resistance in the fixing area 25 can be reduced. The term "a fiber occupation ratio (Vf)" as used herein refers to a value determined in accordance with the following formula (unit: %).

$$Vf(\%)=(W\times n)/(\rho\times T\times 10)$$

wherein

W: the mass of the reinforcing fiber substrates per 1 m$^2$ (g/m$^2$);

n: the number of the reinforcing fiber substrates laminated;

$\rho$: the density of the reinforcing fibers (g/cm$^3$); and

T: the distance between the molds (mm).

In the means of making the fiber occupation ratio in the fixing area relatively higher compared to that in the non-fixing area, it is preferred that the difference between the fiber occupation ratio in the fixing area and that in the non-fixing area is 1% or more and the fiber occupation ratio in the fixing area ranges from 25 to 70%. It is more preferred that the fiber occupation ratio in the fixing area ranges from 25 to 50%. If the difference in the fiber occupation ratio is less than 1%, a sufficient amount of difference in electric resistance between the fixing area and the non-fixing area cannot occur and, therefore, the effect cannot be exerted satisfactorily. However, even if the difference in the fiber occupation ratio is 1% or more, when the fiber occupation ratio in the fixing area is more than 70%, a substrate layer-substrate layer-contacting area in which the electric resistance is extremely low is formed as the result of the fluctuations in the areal weights of the reinforcing fiber substrates or the like in the area and the electric current is concentrated in the area. Therefore, it becomes difficult to predict and control a portion in which the electric current can flow, and a part of the upper mold or the lower mold which is located in the vicinity of the above-mentioned area is melted or damaged. On the other hand, when the difference in the fiber occupation ratio is 1% or more and the fiber occupation ratio in the fixing area ranges from 25 to 70%, particularly from 25 to 50%, the fluctuations in the electric resistance in a substrate layer-substrate layer-contacting area become small and an electric current can flow in a wide area regardless of the fluctuations in areal weights of the reinforcing fiber substrates or the like, and therefore it becomes possible to predict and control a portion in which the electric current can flow. If the fiber occupation ratio in the fixing area is less than 25%, the fiber density is reduced in the whole area of the preform and therefore rigidity of the preform is lowered and it becomes difficult to keep the shape of the preform.

As the means of making the fiber occupation ratio in the fixing area relatively higher compared to the fiber occupation ratio in the non-fixing area, a means of making the thickness of the laminate in the fixing area relatively smaller compared to the thickness of the substrate laminate in the non-fixing area can be employed. Hereinbelow, an example of an example of the means will be described with reference to a drawing.

Figure 3:
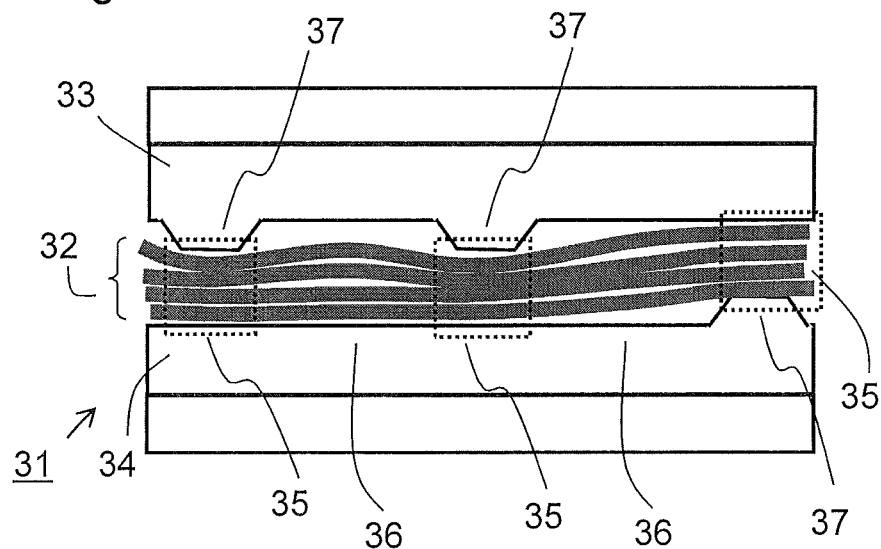
FIG. 3 shows a schematic sectional view of a shaping mold, which illustrates a first example of a means of making the thickness of a laminate in a fixing area relatively smaller compared to the thickness of the substrate laminate in a non-fixing area.

FIG. 3 shows a schematic sectional view of a shaping mold having the substrate laminate placed therein, which is a first example of the means of making the thickness of the laminate in the fixing area relatively smaller compared to the thickness of the substrate laminate in the non-fixing area.

In this example as shown in FIG. 3, a protrusion 37 can be provided at a portion of the mold surface at which the fixing region 35 in the substrate laminate 32 and the surface of the shaping mold are in contact with each other. The shape of the protrusion on the shaping mold 31 is not limited. It is preferred that a substrate laminate 32-contacting surface of the protrusion is smooth and parallel to the surface of the lower mold 34, and it is also preferred that the thickness of the laminate in the fixing region 35 is uniform.

Figure 4:
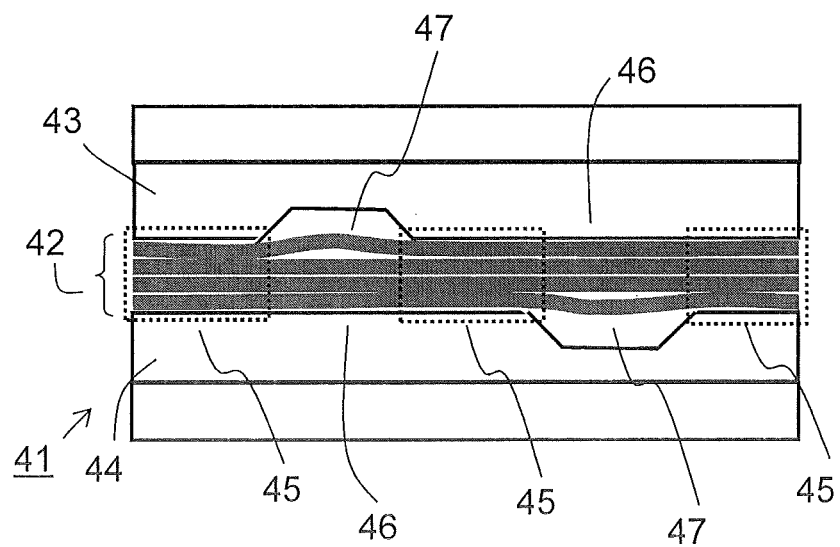
FIG. 4 shows a schematic sectional view of a shaping mold, which illustrates a second example of the means of making the thickness of a laminate in a fixing area relatively smaller compared to the thickness of the substrate laminate in a non-fixing area.

FIG. 4 shows a schematic sectional view of the shaping mold having the substrate laminate placed therein, which is a second example of the means of making the thickness of the laminate in the fixing area relatively smaller compared to the thickness of the substrate laminate in the non-fixing area.

In this example as shown in FIG. 4, a depression 47 can be provided at a portion of the mold surface at which the non-fixing region 46, which is an area other than the fixing area 45, in the substrate laminate 42 and the surface of the shaping mold are in contact with each other. The shape of the depression on the shaping mold 41 is not limited, and is more preferably such a shape that the substrate laminate 42 and the upper mold 43 or the lower mold 44 are not in contact with each other in the non-fixing area 46.

FIG. 5 shows a schematic sectional view of the shaping mold having the substrate laminate placed therein, which is a third example of the means of making the thickness of the laminate in the fixing area relatively smaller compared to the thickness of the substrate laminate in the non-fixing area.

In this example as shown in FIG. 5, the thickness of the substrate laminate in the fixing area 55 can be reduced by arranging a movable part 57 of the mold, which is a part of the shaping mold 51, at a position at which the mold surface of the shaping mold 51 is to be in contact with a portion of the substrate laminate 52 which exists in the fixing area 55, then placing the substrate laminate 52 in a predetermined place in the shaping mold 51 and holding the substrate laminate 52 by the shaping mold 51, and then projecting the movable part 57 of the mold. The shape of the movable part 57 of the mold is not limited. It is preferred that the substrate laminate 52-contacting surface of the movable part 57 of the mold is smooth and parallel to the surface of the lower mold 54, and it is also preferred that the thickness of the laminate in this area is uniform.

FIG. 6 shows a schematic sectional view of the shaping mold having the substrate laminate placed therein, which is a fourth example of the means of making the thickness of the laminate in the fixing area relatively smaller compared to the thickness of the substrate laminate in the non-fixing area.

In this example as shown in FIG. 6, the thickness of the substrate laminate 62 in the non-fixing area 66 can be increased by arranging a movable part 67 of the mold, which is a part of the shaping mold 61, at a position at which the mold surface of the shaping mold 61 is to be in contact with a portion of the substrate laminate 62 which exists in the non-fixing area 66, placing the substrate laminate 62 in a predetermined place in the shaping mold 61 and holding the substrate laminate 62 by the shaping mold 61, and then transferring the movable part 67 of the mold in such a direction that the movable part 67 can move away from the substrate laminate. It is preferred that the substrate laminate 62-contacting surface of the movable part 67 of the mold is smooth and parallel to the lower mold 64, and it is also preferred that the thickness of the laminate in this fixing area 65 is uniform.

Figure 7:
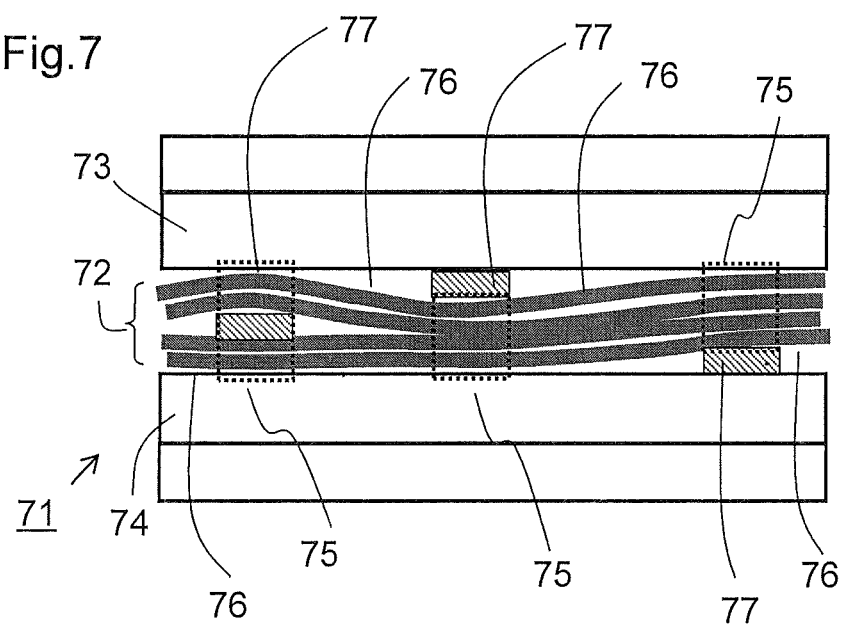
FIG. 7 shows a schematic sectional view of a shaping mold, which illustrates a fifth example of the means of making the thickness of a laminate in a fixing area relatively smaller compared to the thickness of the substrate laminate in a non-fixing area.

FIG. 7 shows a schematic sectional view of the shaping mold having the substrate laminate placed therein, which is a fifth example of the means of making the thickness of the laminate in the fixing area relatively smaller compared to the thickness of the substrate laminate in the non-fixing area.

In this example as shown in FIG. 7, the substrate laminate 72 is placed in a predetermined place in the shaping mold 71, then a conductive material 77, which is different from the reinforcing fibers constituting the substrate laminate 72, is arranged between the substrate laminate 72 and the shaping mold 71 or inserted into the substrate laminate 72 or adhered onto the shaping mold 71 or the substrate laminate 72. When the conductive material 77 is inserted into the substrate laminate 72, the conductive material 77 is inserted previously upon the lamination of the reinforcing fiber substrates, and the substrate laminate 72 having the conductive material 77 inserted therein is then placed in a predetermined place in the shaping mold 71. The material that constitutes the conductive material 77 is not limited, and is preferably a material having high electrical conductivity such as copper, aluminum and alloys thereof.

As another means of making the fiber occupation ratio in the fixing area relatively higher compared to that in the non-fixing area, a means of making the amount of fibers in the fixing area relatively larger compared to that in the non-fixing area can be employed.

Figure 8:
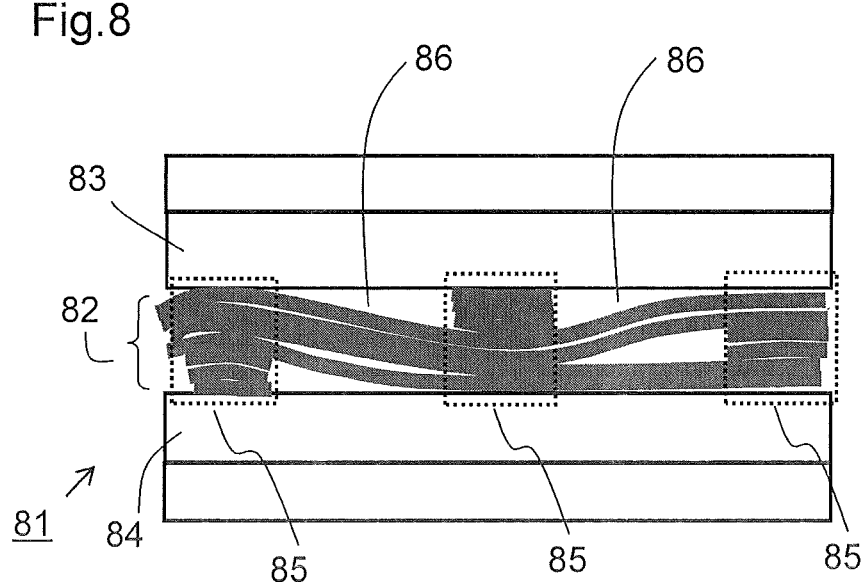
FIG. 8 shows a schematic sectional view of a shaping mold, which illustrates one example of a means of increasing the amount of fibers in a fixing area compared to that in a non-fixing area.

FIG. 8 shows a schematic sectional view of the shaping mold having the substrate laminate arranged therein, which is an example of the means of making the amount of fibers in the fixing area relatively larger compared to that in the non-fixing area.

In this example as shown in FIG. 8, another base material may be arranged on the outermost layer of the substrate laminate 82 or another base material or fiber bundles may be inserted into the substrate laminate 82, for example. The form of the above-mentioned another base material is not limited. For example, the base material may be a woven fabric or a non-woven fabric. The presence or absence of the fixing material is not limited, either. When the above-mentioned another base material is arranged on the outermost layer of the substrate laminate as shown in FIG. 8, it is not needed to adhere unnecessary fibers onto the surface of a produced preform and the same base material can be recycled every time an electric current is applied to the preform. From these points of view, it is preferred not to use a fixing material.

When the substrate laminate has a steep shape and therefore fibers cannot be arranged on the substrate laminate easily, a weak adhesive material that can be removed easily may be used at a portion at which the fibers are to be arranged. Of course, the method of increasing the amount of the fibers in the fixing area 85 is not limited. Since it is required that the reinforcing fibers to be arranged in or inserted into the fixing area have electric conductivity, the reinforcing fibers are preferably carbon fibers.

Figure 9:
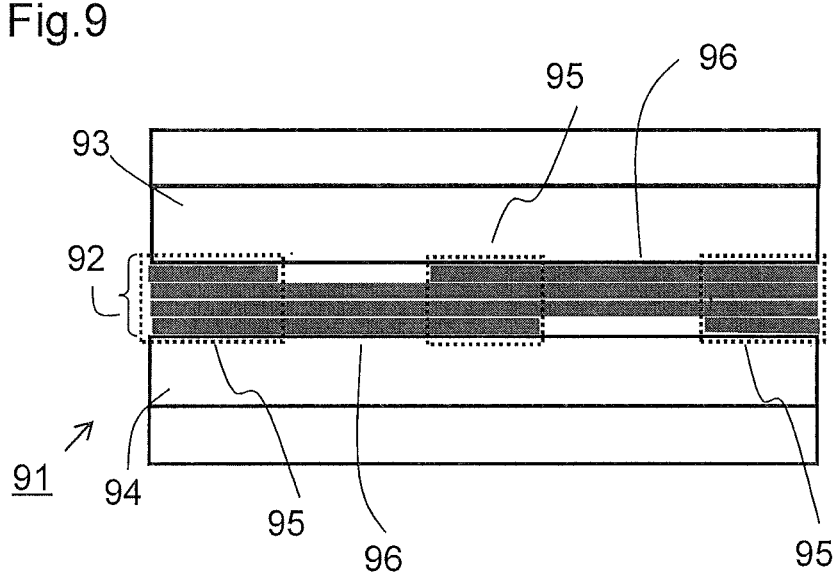
FIG. 9 shows a schematic sectional view of a shaping mold, which illustrates one example of a means of increasing the amount of fibers in a fixing area compared to that in a non-fixing area.

FIG. 9 shows a schematic sectional view of the shaping mold having the substrate laminate arranged therein, which is another example of the means of making the amount of fibers in the fixing area relatively larger compared to that in the non-fixing area.

In this example as shown in FIG. 9, the amount of fibers in the non-fixing area is reduced compared to that in the fixing area by, for example, cutting out and removing a part of substrates contained in the substrate laminate 92 and existing in the non-fixing area 96 with scissors or the like. In this manner, the amount of fibers in the fixing area can become larger than that in the non-fixing area. Of course, the method of reducing the amount of fibers in the non-fixing area 96 is not limited to the above-mentioned method.

EXAMPLES

Hereinbelow, our methods and apparatus will be described in more detail with reference to examples. In the examples, the electric resistance in each portion of a reinforcing fiber preform as measured in the direction of lamination was determined in the following manner. That is, a 20-square-mm test piece was cut out from a portion to be tested in the reinforcing fiber preform, then a measurement terminal of an insulation resistance meter (a product by Tsuruga Electric Corporation: MODEL3565) was attached to the front surface and the back surface of the test piece so that the thickness of the cut-out test piece became unchanged, and the electric resistance was measured in the direction of lamination.

Example 1

(1) Shaping Mold

Figure 10:
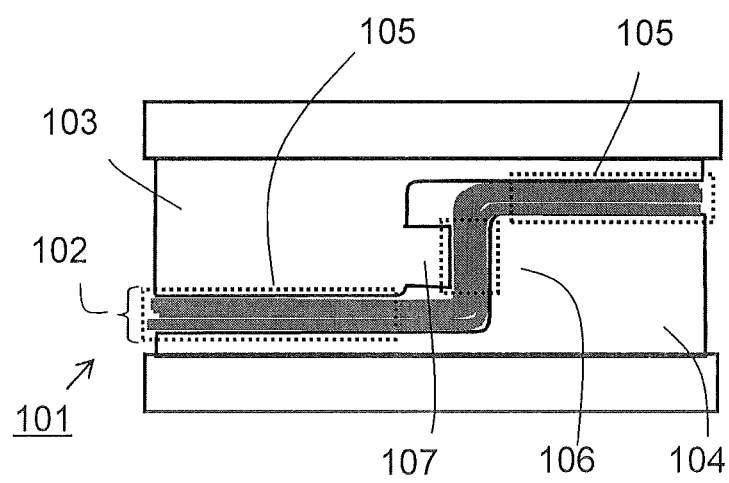
FIG. 10 shows a schematic sectional view of a shaping mold used in Example 1.

An aluminum-made shaping mold 101 having a cross-sectional shape as shown in FIG. 10 was provided. In the production of a preform using the shaping mold 101, a flat-part fixing required portion (a fixing required portion located in a flat part) 105 and a rising-part fixing required portion (a fixing required portion located in a rising part) 106 were employed as fixing areas. In an upper mold 103, a cylindrical protrusion 107 having a diameter ($\phi$) of 30 mm and a height of 0.8 mm was provided at a part at which the upper mold 103 was in contact with the rising-part fixing required portion 106.

(2) Reinforcing Fiber Substrate

As a reinforcing fiber substrate, a carbon fiber woven fabric BT70-30 (a product by Toray Industries, Inc.) (weave structure: plain weave, areal fiber weight: 300 g/m$^2$, reinforcing fibers: T700S-12K) was used. In the substrate, a powdery fixing material having a softening point of 71° C. was sprayed and adhered uniformly onto the whole surface of the substrate in advance.

The substrate was cut into 150-square-mm pieces, and four pieces were laminated together, thereby producing a substrate laminate 102. Subsequently, the substrate laminate 102 was placed on a lower mold 104 of the shaping mold 101.

(3) Production of Preform

The substrate laminate 102 was held by the shaping mold 101, and then a pressure was applied to the shaping mold 101. At this time, the distance between the upper mold 103 and the lower mold 104 was 1.0 mm in the flat-part fixing required portion 105 and the rising-part fixing required portion 106 and was 1.8 mm in another portion, the fiber occupation ratio was 66.7% in the flat-part fixing required portion 105 and the rising-part fixing required portion 106 and was 37.0% in other portion, and the difference in fiber occupation ratio was 29.7%.

Subsequently, a direct-current electric current of 400 A was applied to the substrate laminate 102 in the direction of lamination for three seconds, thereby producing a preform. As a result, the state of fixing between the layers was good in both of the flat-part fixing required portion 105 and the rising-part fixing required portion 106. In the other portion, the layers were not fixed. That is, a good reinforcing fiber preform in which the fixing required portions were fixed was produced.

Electric resistance in the direction of lamination was measured in each of the flat-part fixing required portion 105, the rising-part fixing required portion 106 and other portion using the resultant reinforcing fiber preform. As a result, the electric resistance in each of the flat-part fixing required portion 105 and the rising-part fixing required portion 106 was 30), and the electric resistance in the other portion was 1000Ω.

In addition, an electric current was applied to 10 sets of substrate laminates in the same manner using the same shaping mold. As a result, good reinforcing fiber preforms were produced from eight sets of the substrate laminates. However, in reinforcing fiber preforms produced from two sets of the substrate laminates, the fixing was partially poor in each of the flat-part fixing required portion 105 and the rising-part fixing required portion 106 and the substrates were delaminated partially during transportation.

Example 2

(1) Shaping Mold

Figure 11:
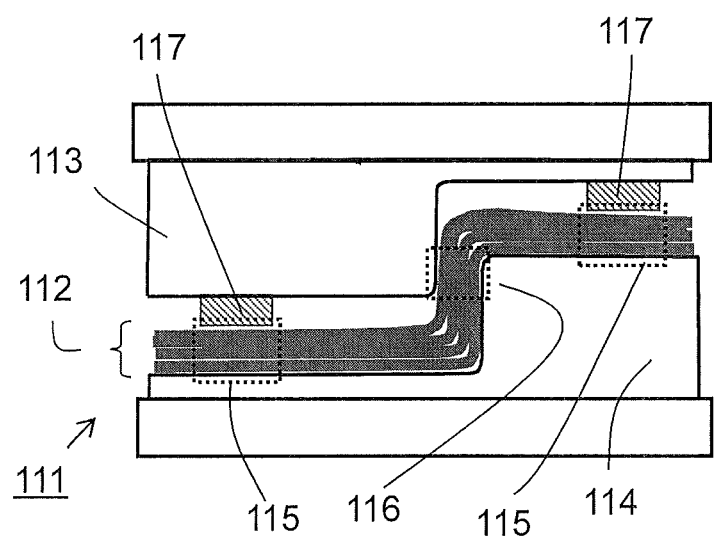
FIG. 11 shows a schematic sectional view of a shaping mold used in Example 2.

An aluminum-made shaping mold 111 having a cross-sectional shape as shown in FIG. 11 was provided. In this example, in the production of a preform using the shaping mold 111, a flat-part fixing required portion 115 and a rising-part fixing required portion 116 were employed as fixing areas. In this example, a protrusion as shown in Example 1 was not formed in the shaping mold.

(2) Reinforcing Fiber Substrate

The same substrate as used in Example 1 was used as a reinforcing fiber substrate.

The substrate was cut into 150-square-mm pieces, and four pieces were laminated together, thereby producing a substrate laminate 112. Subsequently, the substrate laminate 112 was placed on a lower mold 114 of the shaping mold 111.

(3) Production of Preform

In this example, multiple aluminum sheets 117 each having a diameter ($\phi$) of 30 mm and a thickness of 0.5 mm were placed on the substrate laminate 112.

Subsequently, the substrate laminate 112 was held by the shaping mold 111, and then a pressure was applied to the shaping mold 111. At this time, the distance between the upper mold 113 and the lower mold 114 was 1.2 mm in the flat-part fixing required portion 115 and the rising-part fixing required portion 116 and was 1.7 mm in another portion, the fiber occupation ratio was 55.6% in the flat-part fixing required portion 115 and the rising-part fixing required portion 116 and was 39.2% in the other portion, and the difference in fiber occupation ratio was 16.4%.

Subsequently, a direct-current electric current of 400 A was applied to the substrate laminate 112 in the direction of lamination for three seconds, thereby producing a preform. As a result, the state of fixing between the layers was good in both of the flat-part fixing required portion 115 and the rising-part fixing required portion 116. In the other portion, the layers were not fixed to each other. That is, a good reinforcing fiber preform in which the fixing required portions were fixed was produced.

Electric resistance in the direction of lamination was measured in each of the flat-part fixing required portion 115, the rising-part fixing required portion 116 and other portion using the resultant reinforcing fiber preform. As a result, the electric resistance in each of the flat-part fixing required portion 115 and the rising-part fixing required portion 116 was 40Ω, and the electric resistance in the other portion was 900Ω.

In addition, an electric current was applied to 10 sets of substrate laminates in the same manner using the same shaping mold. As a result, good reinforcing fiber preforms were produced from eight sets of the substrate laminates. However, in reinforcing fiber preforms produced from two sets of the substrate laminates, the fixing was partially poor in each of the flat-part fixing requiring portion 115 and the rising-part fixing requiring portion 116 and the substrates were delaminated partially during transportation.

Example 3

An electric current was applied in the same manner as in Example 1, except that the distance between the upper mold 103 and the lower mold 104 was 1.9 mm in the flat-part fixing required portion 105 and the rising-part fixing required portion 106 and was 2.4 mm in other portion, the fiber occupation ratio was 35.1% in the flat-part fixing required portion 105 and the rising-part fixing required portion 106 and was 27.8% in another portion, and the difference in fiber occupation ratio was 7.3%, thereby producing a preform. As a result, the state of fixing between the layers was good in both of the flat-part fixing required portion 105 and the rising-part fixing required portion 106. In the other portion, the layers were not fixed to each other. That is, a good reinforcing fiber preform in which the fixing required portions were fixed was produced.

Electric resistance in the direction of lamination was measured in each of the flat-part fixing required portion 105, the rising-part fixing required portion 106 and other portion using the resultant reinforcing fiber preform. As a result, the electric resistance in each of the flat-part fixing required portion 105 and the rising-part fixing required portion 106 was 55Ω, and the electric resistance in the other portion was 1100Ω.

In addition, an electric current was applied to 10 sets of substrate laminates in the same manner using the same shaping mold. As a result, extremely superior reinforcing fiber preforms were produced from all of the 10 sets of the substrate laminates.

Example 4

An electric current was applied in the same manner as in Example 1, except that the distance between the upper mold 103 and the lower mold 104 was 2.1 mm in the flat-part fixing required portion 105 and the rising-part fixing required portion 106 and was 2.6 mm in other portion, the fiber occupation ratio was 31.7% in the flat-part fixing required portion 105 and the rising-part fixing required portion 106 and was 25.6% in another portion, and the difference in fiber occupation ratio was 6.1%, thereby producing a preform. As a result, the state of fixing between the layers was good in both of the flat-part fixing required portion 105 and the rising-part fixing required portion 106. In the other portion, the layers were not fixed to each other. That is, a good reinforcing fiber preform in which the fixing required portions were fixed was produced.

Electric resistance in the direction of lamination was measured in each of the flat-part fixing required portion 105, the rising-part fixing required portion 106 and other portion using the resultant reinforcing fiber preform. As a result, the electric resistance in each of the flat-part fixing required portion 105 and the rising-part fixing required portion 106 was 75Ω, and the electric resistance in the other portion was 1100Ω.

In addition, an electric current was applied to 10 sets of substrate laminates in the same manner using the same shaping mold. As a result, extremely superior reinforcing fiber preforms were produced from all of the 10 sets of the substrate laminates.

Example 5

An electric current was applied in the same manner as in Example 1, except that the distance between the upper mold 103 and the lower mold 104 was 0.9 mm in the flat-part fixing required portion 105 and the rising-part fixing required portion 106 and was 1.4 mm in other portion, the fiber occupation ratio was 74.1% in the flat-part fixing required portion 105 and the rising-part fixing required portion 106 and was 47.6% in another portion, and the difference in fiber occupation ratio was 26.5%, thereby producing a preform. As a result, the flow of an electric current was concentrated in a portion of each of the flat-part fixing required portion 105 and the rising-part fixing required portion 106, and therefore a preform in which the layers were partially delaminated in the flat-part fixing required portion 105 and the rising-part fixing required portion 106 was produced.

Electric resistance in the direction of lamination was measured in each of the flat-part fixing required portion 105, the rising-part fixing required portion 106 and the other portion using the resultant reinforcing fiber preform. As a result, the electric resistance in each of the flat-part fixing required portion 105 and the rising-part fixing required portion 106 was 30Ω, and the electric resistance in the other portion was 900Ω.

The preform was further examined, and it was confirmed that the upper mold 103 and the lower mold 104 were partially damaged in the flat-part fixing required portion 105 and the rising-part fixing required portion 106. That is, although a reinforcing fiber preform in which the fixing required portion was fixed was produced, the upper mold 103 and the lower mold 104 were partially damaged and the reinforcing fiber preform could not be molded continuously.

Example 6

An electric current was applied in the same manner as in Example 1, except that the distance between the upper mold 103 and the lower mold 104 was 2.6 mm in the flat-part fixing required portion 105 and the rising-part fixing required portion 106 and was 2.7 mm in another portion, the fiber occupation ratio was 25.6% in the flat-part fixing required portion 105 and the rising-part fixing required portion 106 and was 24.7% in other portion, the difference in fiber occupation ratio was 0.9%, and a direct-current electric current of 400 A was applied to the substrate laminate 102 in the direction of lamination for 10 seconds, thereby producing a preform. As a result, a sufficient amount of difference in electric resistance was produced among the flat-part fixing required portion 105, the rising-part fixing required portion 106 and the other portion, and the layers were partially fixed in the flat-part fixing required portion 105, the rising-part fixing required portion 106 and other portion. That is, although a reinforcing fiber preform in which the fixing required portions and the other portion were fixed, the cycle time was prolonged and therefore the amount of energy consumption was increased.

The produced reinforcing fiber preform was used to measure the electric resistance in the direction of lamination in the flat-part fixing required portion 105, the rising-part fixing required portion 106 and other portion. As a result, the electric resistance in each of the flat-part fixing required portion 105 and the rising-part fixing required portion 106 was 100Ω, and the electric resistance in other portion was 120Ω.

In addition, an electric current was applied to 10 sets of the substrate laminates in the same manner using the same shaping mold. As a result, a reinforcing fiber preform was produced using each of eight sets among the 10 sets of the substrate laminates. However, with respect to two sets among the 10 sets of the substrate laminates, the fixing at a portion of each of the flat-part fixing required portion 105 and the rising-part fixing required portion 106 was weak, and the substrates were delaminated partially during transportation.

Example 7

An electric current was applied in the same manner as in Example 1, except that the distance between the upper mold 103 and the lower mold 104 was 2.7 mm in the flat-part fixing required portion 105 and the rising-part fixing required portion 106 and was 3.0 mm in another portion, the fiber occupation ratio was 24.7% in the flat-part fixing required portion 105 and the rising-part fixing required portion 106 and was 22.2% in the other portion, the difference in fiber occupation ratio was 2.5%, and a direct-current electric current of 400 A was applied to the substrate laminate 102 in the direction of lamination for 10 seconds, thereby producing a preform. As a result, the state of the fixing between the layers was good in each of the flat-part fixing required portion 115 and the rising-part fixing required portion 116, and the layers were not fixed to each other in the other portion. That is, although a fiber reinforcing preform in which the fixing required portions were fixed was produced, the cycle time was prolonged and therefore the amount of energy consumption was increased.

The produced reinforcing fiber preform was used to measure the electric resistance in the direction of lamination at the flat-part fixing required portion 105, the rising-part fixing required portion 106 and other portion. As a result, the electric resistance in each of the flat-part fixing required portion 105, the rising-part fixing required portion 106 was 120Ω, and the electric resistance in the other portion was 1200Ω.

In addition, an electric current was applied to 10 sets of the substrate laminates in the same manner using the same shaping mold. As a result, a reinforcing fiber preform was produced using each of eight sets among the 10 sets of the substrate laminates. However, with respect to two sets among the 10 sets of the substrate laminates, the fixing at a portion of each of the flat-part fixing required portion 105 and the rising-part fixing required portion 106 was weak, and the substrates were delaminated partially during transportation.

Comparative Example 1

(1) Shaping Mold

Figure 12:
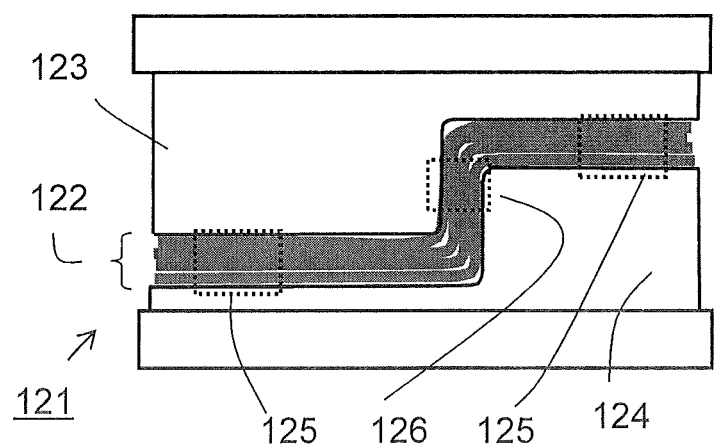
FIG. 12 shows a schematic sectional view of a shaping mold used in Comparative Example.

An aluminum-made shaping mold 121 having a cross-sectional shape as shown in FIG. 12 was provided. In this comparative example, in the production of a preform using the shaping mold 121, a flat-part fixing required portion 125 was employed as a fixing area. In this comparative example, the shaping mold had no protrusion as shown in Example 1.

(2) Reinforcing Fiber Substrate

The same reinforcing fiber substrate as used in Example 1 was used as a reinforcing fiber substrate.

The substrate was cut into 150-square-mm pieces, and four pieces were laminated together, thereby producing a substrate laminate 122. Subsequently, the substrate laminate 122 was placed on a lower mold 124 in the shaping mold 121.

(3) Production of Preform

The substrate laminate 122 was held by the shaping mold 121, and then a pressure was applied to the shaping mold 121. At this time, the distance between the upper mold 123 and the lower mold 124 was 1.8 mm in each portion, the fiber occupation ratio between the upper mold 123 and the lower mold 124 was 37.0% in each portion, and fixing was carried out in all of portions including the flat-part fixing required portion 125.

A direct-current electric current of 400 A was applied to the substrate laminate 122 in the direction of lamination for three seconds. However, the layers were not fixed in the flat-part fixing required portion 125 and a reinforcing fiber preform could not be produced. The substrate laminate was further examined, and it was confirmed that there was an actually fixed portion 126 in a part of the rising-part. Then, the actually fixed portion 126 was examined in detail, and we found that the distance between the upper mold 123 and the lower mold 124 of the shaping mold 121 was 1.6 mm and the fiber occupation ratio between the upper mold 123 and the lower mold 124 was 41.7% in the actually fixed portion 126 and, therefore, the actually fixed portion 126 was a portion in which the fiber occupation ratio was highest. The difference in the fiber occupation ratio between the flat-part fixing required portion 125 and the actually fixed portion 126 was 4.7%.

The produced reinforcing fiber preform was used to measure the electric resistance in the direction of lamination in the flat-part fixing required portion 125 and the actually fixed portion 126. As a result, the electric resistance in the flat-part fixing required portion 125 was 1000Ω, and the electric resistance in the actually fixed portion 126 was 50Ω.

In addition, an electric current was applied to 10 sets of the laminates in the same manner. As a result, at least a part of the flat-part fixing required portion was not fixed in all of the 10 sets of the laminates, and therefore a reinforcing fiber preform could not be produced.

The main conditions and the results of the evaluations in the examples and the comparative example are shown in Table 1.

TABLE 1

|  | Thickness of fixing required portion [mm] | Vf of fixing required portion [%] | Thickness of other portion [mm] | Vf of other portion [%] | Difference in Vf [%] | Electric resistance in fixing required portion in preform [Ω] | Electric resistance in other portion in preform [Ω] | Evaluation |
| --- | --- | --- | --- | --- | --- | --- | --- | --- |
| EXAMPLE 1 | 1.0 | 66.7 | 1.8 | 37.0 | 29.6 | 30 | 1000 | A |
| EXAMPLE 2 | 1.2 | 55.6 | 1.7 | 39.2 | 16.3 | 40 | 900 | A |
| EXAMPLE 3 | 1.9 | 35.1 | 2.4 | 27.8 | 7.3 | 55 | 1100 | S |
| EXAMPLE 4 | 2.1 | 31.7 | 2.6 | 25.6 | 6.1 | 75 | 1100 | S |
| EXAMPLE 5 | 0.9 | 74.1 | 1.4 | 47.6 | 26.5 | 30 | 900 | B |
| EXAMPLE 6 | 2.6 | 25.6 | 2.7 | 24.7 | 0.9 | 100 | 120 | B |
| EXAMPLE 7 | 2.7 | 24.7 | 3.0 | 22.2 | 2.5 | 120 | 1200 | B |

|  | Thickness of fixing required portion [mm] | Vf of fixing required portion [%] | Thickness of actually fixed portion [mm] | Vf of actually fixed portion [%] | Difference in Vf [%] | Electric resistance in fixing required portion in preform [Ω] | Electric resistance in actually fixed portion in preform [Ω] | Evaluation |
| --- | --- | --- | --- | --- | --- | --- | --- | --- |
| COMPARATIVE EXAMPLE 1 | 1.8 | 37.0 | 1.6 | 41.7 | 4.7 | 1000 | 50 | C |

In the column of "Evaluation" in Table 1, the evaluation symbols have the following meanings.

S: the shaping mold was not damaged, the amount of energy consumption was small, and an extremely superior preform was produced.

A: the shaping mold was not damaged, the amount of energy consumption was small, and a good preform could be produced B: a preform could be produced, but a part of the shaping mold was damaged or the time required for the application of an electric current was prolonged and the amount of energy consumption was large.

C: a preform could not be produced.

The invention claimed is:

1. A method of producing a reinforcing fiber preform comprising:

holding at least one substrate laminate by a shaping mold composed of at least two molds that face each other, wherein the at least one substrate laminate is selected from a substrate laminate produced by laminating multiple reinforcing fiber substrates each having a fixing material applied to at least one surface thereof and a substrate laminate produced by laminating multiple reinforcing fiber substrates with the fixing material interposed therebetween; and subsequently applying an electric current to the substrate laminate in a direction of lamination to heat the reinforcing fiber substrates and thereby apply heat to the fixing material to further fix substrate layers comprising the substrate laminate to each other by a mechanism that makes electric resistance in a fixing area relatively lower compared to that in a non-fixing area in the substrate laminate, wherein the mechanism makes a fiber occupation ratio in the fixing area relatively higher compared to that in the non-fixing area upon holding the substrate laminate by the shaping mold.

2. The method according to claim 1, wherein the mechanism is a means of making a thickness of the substrate laminate in the fixing area relatively smaller compared to that in the non-fixing area.

3. The method according to claim 2, wherein the means of making the thickness of the substrate laminate in the fixing area relatively smaller compared to that in the non-fixing area is to protrude a part of a surface of the shaping mold at which the substrate laminate existing in the fixing area is in contact with the surface of the shaping mold.

4. The method according to claim 2, wherein the means of making the thickness of the substrate laminate in the fixing area relatively smaller compared to that in the non-fixing area is to depress a part of a surface of the shaping mold at which the substrate laminate existing in the non-fixing area is in contact with the surface of the shaping mold.

5. The method according to claim 2, wherein the means of making the thickness of the substrate laminate in the fixing area relatively smaller compared to that in the non-fixing area is to, after holding the substrate laminate by the shaping mold, protrude a movable part of the shaping mold in such a direction that the thickness of the substrate laminate in the fixing area can be reduced, wherein the movable part is provided at a part of the shaping mold at which the substrate laminate existing in the fixing area is in contact with a surface of the shaping mold.

6. The method according to claim 2, wherein the means of making the thickness of the substrate laminate in the fixing area relatively smaller compared to that in the non-fixing area is to, after holding the substrate laminate by the shaping mold, transfer a movable part of the shaping mold in such a direction that the thickness of the substrate laminate in the non-fixing area can be increased, wherein the movable part is provided at a part of the shaping mold at which the substrate laminate existing in the non-fixing area is in contact with a surface of the shaping mold.

7. The method according to claim 2, wherein the means of making the thickness of the substrate laminate in the fixing area relatively smaller compared to that in the non-fixing area is to insert or adhere a conductive material other than reinforcing fibers into or onto the fixing area.

8. The method according to claim 1, wherein the mechanism makes a number of fibers in the fixing area larger than that in the non-fixing area.

9. The method according to claim 1, wherein, in the mechanism ((a fiber occupation ratio in the fixing area)−(a fiber occupation ratio in the non-fixing area)) is adjusted to 1% or more and the fiber occupation ratio in the fixing area is adjusted to 25 to 70%.

10. An apparatus that produces a reinforcing fiber preform, which is so configured that a power supply is connected to at least two molds that together comprise a shaping mold and face each other so that a voltage can be applied to a reinforcing fiber substrate laminate placed between the molds of the shaping mold, wherein the apparatus is equipped with a mechanism that makes electric resistance in a fixing area relatively lower compared to that in a non-fixing area in the substrate laminate.

11. The apparatus according to claim 10, wherein the mechanism that makes the electric resistance in the fixing area relatively lower compared to that in the non-fixing area is a mechanism that makes a fiber occupation ratio in the fixing area relatively higher compared to that in the non-fixing area upon holding the substrate laminate.

12. The apparatus according to claim 11, wherein the mechanism that makes the fiber occupation ratio in the fixing area relatively higher compared to that in the non-fixing area upon holding the substrate laminate is a mechanism that makes a thickness of the substrate laminate in the fixing area relatively smaller compared to that in the non-fixing area.

13. The apparatus according to claim 12, wherein the mechanism that makes the thickness of the substrate laminate in the fixing area relatively smaller compared to that in the non-fixing area is a previously protruded part of a surface of the shaping mold at which the substrate laminate existing in the fixing area is in contact with the surface of the shaping mold.

14. The apparatus according to claim 12, wherein the mechanism that makes the thickness of the substrate laminate in the fixing area relatively smaller compared to that in the non-fixing area is a mechanism for previously depressing a part of a surface of the shaping mold at which the substrate laminate existing in the non-fixing area is in contact with the surface of the shaping mold.

15. The apparatus according to claim 12, wherein the mechanism that makes the thickness of the substrate laminate in the fixing area relatively smaller compared to that in the non-fixing area is a mechanism for, after holding the substrate laminate by the shaping mold, projecting a movable part of the shaping mold in such a direction that the thickness of the substrate laminate in the fixing area can be reduced, wherein the movable part is provided at a part of the shaping mold at which the substrate laminate existing in the fixing area is in contact with a surface of the shaping mold.

16. The apparatus according to claim 12, wherein the mechanism that makes the thickness of the substrate laminate in the fixing area relatively smaller compared to that in the non-fixing area is a mechanism for, after holding the substrate laminate by the shaping mold, transferring a part at which the substrate laminate existing in the non-fixing area is in contact with a surface of the shaping mold in such a direction that the thickness of the substrate laminate in the non-fixing area can be increased.

* * * * *